US008099679B2

(12) United States Patent
Yee et al.

(10) Patent No.: US 8,099,679 B2
(45) Date of Patent: Jan. 17, 2012

(54) METHOD AND SYSTEM FOR TRAVERSING DIGITAL RECORDS WITH MULTIPLE DIMENSIONAL ATTRIBUTES

(75) Inventors: Nicholas K. Yee, Mountain View, CA (US); Victoria M. E. Bellotti, San Francisco, CA (US); Nicolas B. Ducheneaut, Sunnyvale, CA (US); Ignacio Solis, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 854 days.

(21) Appl. No.: 12/031,357

(22) Filed: Feb. 14, 2008

(65) Prior Publication Data

US 2009/0210793 A1 Aug. 20, 2009

(51) Int. Cl.
*G06F 3/048* (2006.01)

(52) U.S. Cl. ......... 715/825; 715/811; 715/833; 715/835

(58) Field of Classification Search .................. 715/704, 715/714, 723, 764, 835, 839, 963, 705, 811, 715/825, 833
See application file for complete search history.

(56) References Cited

U.S. PATENT DOCUMENTS

| 7,673,248 | B2 * | 3/2010 | Narayanaswami | ........... 715/764 |
| 2008/0109756 | A1 * | 5/2008 | Stambaugh | .................... 715/835 |
| 2008/0307363 | A1 * | 12/2008 | Jalon et al. | .................... 715/835 |

OTHER PUBLICATIONS

Toyama et al., "Geographic Location Tags on Digital Images", MM'03, Nov. 2-8, 2003, Berkeley California, USA, Copyright 2003 ACM, pp. 156-166.*

Yee, Ka-Ping et al., Faceted Metadata for Image Search and Browsing, University of California, Berkeley, Paper: Searching and Organizing, vol. No. 5, Issue No. 1, Apr. 5-10, 2003, Ft. Lauderdale, Florida, USA, pp. 401-408.

Chi, Ed Huai-Hsin et al., Flexible Information visualization of Multivariate Data from Biological Sequence Similarity Searches, Computational Biology Centers, Medical School, University of Minnesota, Box 196, UMHC, 1460 Mayo Building, 420 Delaware St. S.E., Minneapolis, MN 55455, Department of Computer Science, University of Minnesota, 4-192 EE/CSci Building, 1996 IEEE, pp. 133-140, 477.

Aleks, Aris et al., Exploiting Location and Time for Photo Search and Storytelling in MyLifeBits, University of Maryland and Microsoft Research, Microsoft Corporation, One Microsoft Way, Redmond, WA 98052, Sep. 2004, Technical Report, MSR-TR-2004-102, http://research.microsoft.com/~jgemmell/pubs/MSR-TR-2004-102-Aris.doc, pp. 1-8.

* cited by examiner

*Primary Examiner* — William Bashore
*Assistant Examiner* — Andrew Tank
(74) *Attorney, Agent, or Firm* — Shun Yao; Park, Vaughan, Fleming & Dowler LLP

(57) ABSTRACT

A system facilitates traversing digital records with dimensional attributes. The system stores a number of digital records. The system further associates a respective digital record with a number of attributes, wherein a respective attribute can be specified in a number of levels of abstraction. The system allows a user to control a presentation of the stored digital records based on their attributes. The user can set one or more criteria for the attributes of the digital records to be presented by: specifying the value of at least one fixed attribute of the digital records to be presented, changing at least one non-fixed attribute of the digital records to be presented, and/or specifying a level of abstraction for the fixed and/or non-fixed attribute of the digital records to be presented. The system then presents a set of digital records to the user based on the attribute criteria set by the user.

21 Claims, 7 Drawing Sheets

METHOD AND SYSTEM FOR TRAVERSING DIGITAL RECORDS WITH MULTIPLE DIMENSIONAL ATTRIBUTES

FIELD OF THE INVENTION

The present disclosure relates to information-retrieving systems. More specifically, the present disclosure relates to a system that allows a user to traverse digital records based on multiple dimensional attributes.

RELATED ART

The relentless growth of the Internet has dramatically changed the way we store information. Today, almost all forms of records, including newspaper, books, images, and sound, can be stored in some digital format. Meanwhile, the ubiquitous Internet connectivity has enabled unprecedented accessibility to such digital records. As a result, one can store and retrieve both public and private information over the Internet on a daily basis.

For example, one can upload digital photographs and video clips using an online hosting service. Such uploading and viewing operations are becoming increasingly common among even the least technology-savvy users, especially with digital-media equipment becoming commoditized and online hosting services getting easier to use. Many online hosting services also combine this storage service with social networking functions, which allow users to share digital records with family members and friends.

However, current online hosting services store digital records in a relatively flat and un-organized fashion. For example, most photograph or video sharing servers store photographs in their native form and provide only simple tagging or annotation functions. These tags or annotations are often unstructured. A user can only browse the records in a predetermined order or retrieve them by searching for keywords. This flat, unstructured organization scales poorly, and might frustrate the user when he wants to traverse a large number of records.

SUMMARY

One embodiment of the present invention provides a system that facilitates traversing digital records with dimensional attributes. The system stores a number of digital records and associates a respective digital record with a number of attributes. A respective attribute can be specified in a number of levels of abstraction. The system allows a user to control a presentation of the stored digital records based on their attributes. The user can set one or more criteria for the attributes of the digital records to be presented by: specifying the value of at least one fixed attribute of the digital records to be presented, changing at least one non-fixed attribute of the digital records to be presented, and/or specifying a level of abstraction for the fixed and/or non-fixed attribute of the digital records to be presented. The system then presents a set of digital records to the user based on the attribute criteria set by the user.

In a variation on this embodiment, a respective digital record comprises one or more of a photograph, a piece of video, a piece of audio, and a piece of text.

In a variation on this embodiment, the system presents values for non-changing, non-fixed attributes with the associated digital records, thereby providing annotative information for the presented digital records to the user.

In a variation on this embodiment, an attribute of a respective digital record corresponds to at least one of: a time, a range of time; a place, a person; a group of people; an organization; an entity; and an event.

In a further variation, specifying the value of the fixed attribute involves specifying a time, thereby allowing digital records associated with the specified time to be presented; specifying a place, thereby allowing digital records associated with the specified place to be presented; specifying an entity; thereby allowing digital records associated with the specified entity to be presented; specifying an event, thereby allowing digital records associated with the specified event to be presented; or specifying a person, a group of people, and/or an organization, thereby allowing the digital records associated with the people, group, or organization to be presented.

In a further variation, changing the value of the non-fixed attribute involves changing a time value, thereby allowing digital records associated with different times to be presented; changing a place value, thereby allowing digital records associated with different places to be presented; changing an entity value, thereby allowing digital records associated with different entities to be presented; changing an event value, thereby allowing digital records associated with different events to be presented; or changing a value indicative of people and/or groups, thereby allowing digital records associated with different people and/or groups to be presented.

In a further variation, presenting the set of digital records based on the attribute criteria set by the user involves displaying on a graphical user interface (GUI) at least one digital record whose attributes satisfy the criteria. The system also presents one or more of: a slide bar labeled with time values to indicate the time associated with the displayed digital record and to allow the user to specify a different time by sliding an indicator along the slide bar, a map to indicate the place associated with the displayed digital record and to allow the user to specify a different place by indicating a point on the map, a first text field to indicate the person, group, or organization associated with the displayed digital record and to allow the user to specify a different person, group, or organization, and a second text field to indicate the event associated with the displayed digital record and to allow the user to specify a different event.

DETAILED DESCRIPTION

Figure 1:
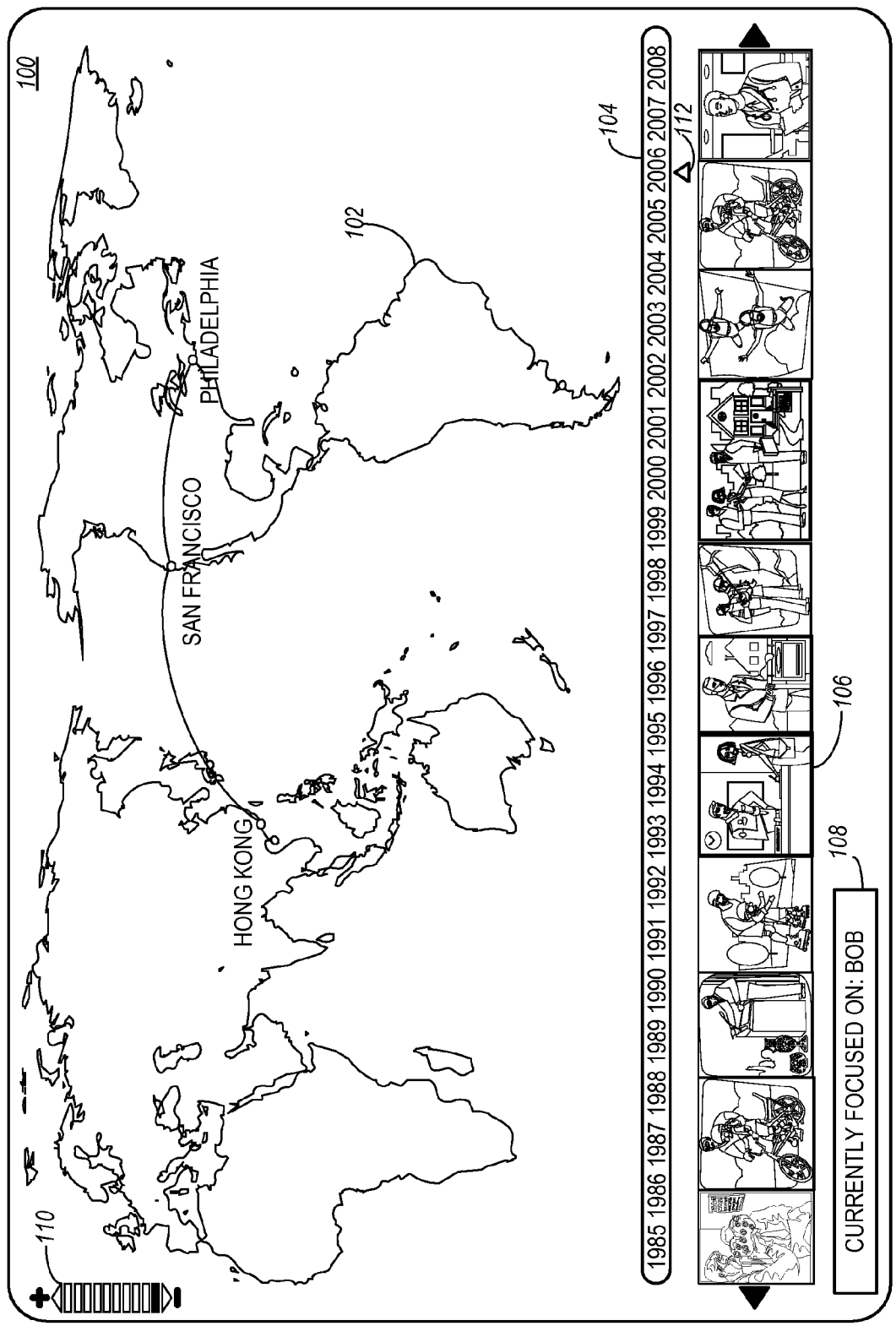
FIG. 1 illustrates an exemplary graphical user interface (GUI) which allows a user to traverse photographs based on multiple dimensional attributes, in accordance with one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. In addition, although embodiments of the present invention are described with examples in the English language, application of the present invention is not limited to English, but can be extended to any language, such as eastern Asian languages, including Japanese, Korean, and Chinese.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

At present, many social-networking websites facilitate the storing and sharing of digital records. Most services allow tagging or annotating the records. For example, when a user uploads a photograph, he can tag the photograph with various keywords or phrases. However, the existing systems cannot leverage the implicit relationship between these records and present them in a more meaningful way.

Most existing systems only provide two ways, namely search and browse, for accessing digital records. When searching the records, a user can search for records with specific properties. However, the hits resulting from the searches are often unorganized, making it difficult for the user to identify useful records. When browsing the records, the user can only access the records in a limited manner, such as in descending alphabetical order. Both searching and browsing can be too rigid and often ineffective for locating a large number of meaningful records. As a result, these conventional record-traversing methods are becoming increasingly inadequate while the number of digital records continues to grow.

Embodiments of the present invention provide a system for traversing digital records in an intuitive way that allows the user to see the relationships between records and identify a large number of meaningful results. This system hinges on conceptualizing a digital record as the intersection of multiple dimensional attributes. For example, a photograph or a video clip contains several types of information, such as Time, People, Place, Entity, and Event. These different types of information can be considered as attributes that are logically orthogonal to each other and hence correspond to different dimensions in a semantic space. The present system allows a user to traverse digital records by controlling how the records are displayed based on these dimensional attributes. For example, the user can fix the value of one attribute, change the value of another attribute, and see all the matching records.

In this disclosure, the term "digital record" or "record" refers to any type of records that can be stored in a digital format. Such records include, but are not limited to, digital photograph, video clip, audio clip, text, and combination thereof. These records can be stored in a repository that is accessible over the Internet.

Dimensional Attributes

Embodiments of the present invention allow a user to traverse digital records by specifying the values and/or ranges of the dimensional attributes. In some embodiments, a record is associated with a number of dimensional attributes, which can be contained in a number of metadata fields associated with that record. Note that a metadata field can contain continuous and ordered values, such as Time, or discrete and unordered values, such as People, Place, Entity, or Event. Note that the Entity attribute can specify an object, such as a book or sculpture, associated with a digital record.

The value in a metadata field, which corresponds to a dimension, can be specified at different levels of abstraction. For example, the value of a Place field can be a building, a street, a city block, a town, or a country. The value of a People field can be an individual, a family, a social group, or an organization. The value of an Event field can be an event name (e.g., CHI 2007) or an event type (e.g., technology conference). Note that the system can identify and collect from public sources values of a field on different abstraction levels, such as those for geographical locations. In other circumstances, these values can also be collected from the users. For example, a user can specify the family and social group to which he belongs.

Based on these dimensional attributes, the system can allow a user to control the display of a large number of records with multiple degrees of freedom. In one embodiment, the user can designate at least one dimension as a focal attribute, the value of which is fixed. The user can designate at least another dimension as a sliding attribute, the value of which can be changed dynamically by the user when viewing the records. The user can further designate one or more dimensions as annotated attributes, the values of which are overlaid on the display of the sliding attribute (e.g., the timeline, if time was designated as the sliding attribute). In one embodiment, this annotated variable annotates the display of the sliding variable. The user can repeatedly designate different dimensions for the specified attributes as he browses through the digital records.

The focal attribute can be any dimensional attribute, such as People, Time, Place, or Event. Furthermore, the user can broaden or narrow the abstraction level of the focal attribute. For example, for the People attribute, the user can specify an individual's name, a family, a social group, or an organization. For the Place attribute, the user can specify a venue, a district, a city, or a state. For the Event attribute, the user can specify a particular event (e.g., CHI 2007), a series of events (e.g., all CHI conferences), or a type of event (e.g., all technology conferences).

Note that a user can designate multiple attributes as the focal attributes. A user can also specify multiple values or value ranges for a given focal attribute. For example, a user can designate both Time and People as the focal attributes. For a respective focal attribute, the user can specify multiple values. For example, the user can specify more than one person, group, or organization for the People attribute. Furthermore, the user can use a Boolean function to combine multiple attributes when designating a focal attribute. The user can use Boolean connectors, such as "AND," "OR," and "NOT," as well as other logic or arithmetic operators such as "greater than" and "at least," to specify attribute values. For example, the user can designate "Bob AND Dave AND (NOT Paul) in Boston" as a value for the focal attribute.

For the sliding attribute, if the attribute value is continuous (e.g., Time), the user can change the attribute value continuously using, for example, a slide bar. In addition, the records can be presented in an ordered manner (e.g., in chronological order). If the attribute value is discrete (e.g., Place and People attributes), the system generates a list of the unique values ordered alphabetically or sorted by the number of occurrences. The user can change the attribute value manually by typing the value or by indicating the value with a pointing device. For example, for the Place attribute, the user can change the value by selecting a location on a map. For the People attribute, the user can change the value by typing people's names or selecting names from a drop-down menu.

Note that the user can broaden or narrow the abstraction level of the sliding attribute. For example, when the sliding attribute is Time, the user can specify hours, days, weeks, months, years, or decades as the time unit. When the sliding attribute is Place, the user can specify country, state, area, city, local landmarks, or street address as the level of detail. Thus, for example, given the initial sliding attribute of the city of "Palo Alto," the user can broaden the search to the area of "San Francisco Bay Area" or narrow the search to the local landmark of "Stanford Campus."

The term "sliding attribute" does not necessarily mean that the user can always continuously change the attribute value. This term is used to indicate that the user can dynamically change the attribute value when viewing the records. Furthermore, for discrete sliding attributes, the system can display records in groups based on the attribute value sorted in a variety of ways, for example in alphabetical order or in the order of number of occurrences.

The annotated attributes can include any attributes that are neither the focal nor sliding attribute. The values of the annotated attributes can be displayed with, or "overlaid" on, the values of the sliding attribute. For example, if Time is selected as the sliding attribute, the system can overlay Place and/or Event on top of the timeline. Thus, it would be easy for the user to see, for example, that the photographs taken for a person "Bob" in 1980 might all be associated with San Francisco. Optionally, the user can also broaden and narrow the level of abstraction for any of the annotated attributes.

In one embodiment of the present invention, the system allows a user to define what a place, group, organization, or event is. In general, these attributes are human constructions and may include or be based on other Basic Attributes. Basic Attributes are the building blocks of such human constructions and may be properties of the universe that the system can take as given, such as Time and Location. The values of other Basic Attributes such as People (e.g., names) or Entity (e.g., book titles, sculpture names, etc.) may be entered into the system by a user.

For example, for the People attribute, a user can define the value "schoolmates," which is a group of people, by associating "schoolmates" with a list of names of his schoolmates. The user can also define the value of "home neighborhood" for the Place attribute by associating "home neighborhood" with a range of geographic location.

In one embodiment, the system provides a UI that allows a user to create a new instance of one of these composites and then specify time ranges or locations it encompasses, or a number of people associated with it. In one embodiment, the user can select a "Create New" option and further choose a Place, Group, Organization, or Event attribute. The UI then allows the user to specify the Basic Attributes included in the composite, such as time(s), time ranges, location(s), person/people, and/or entity/entities.

Traversing the Records

In embodiments of the present invention, the system allows a user to traverse the digital records based on a combination of dimensional attributes with different designations, at different levels of distraction. The example described below illustrates the operation of the system in one embodiment.

In one embodiment, a repository stores digital photographs, each of which is associated with three dimensional attributes: People, Place, and Time. A photograph presented to the user is accompanied by the information contained in the dimensional attributes, such as the associated Time, Place, and People information. A user can designate an attribute as the focal, sliding, or annotated attribute when viewing a particular photo to explore the records along a different dimension. For example, a user may view a photograph of Paul and Mary in front of a concert hall taken in March 1980. The system lists the values of the three attributes related to the photograph under their respective category headings. Thus, under the "People" header are the values "Paul" and "Mary." The user then becomes interested in seeing other photographs of Paul over different periods. Accordingly, the user selects the value "Paul" as the focal attribute and the "Time" header as the sliding attribute. When the user selects "Paul" as the focal attribute, the system understands that the user would like to focus on a specific instance of the People attribute.

In response, the system presents a number of thumbnail-sized photographs of Paul, organized in a strip in chronological order and centered on the photograph taken in March 1980. The user can use a user-interface (UI) element, such as a scrollbar or arrows, to move forward or backward in time to traverse all the photographs associated with Paul. The user can additionally select Place as the annotated attribute. Correspondingly, the system overlays the places associated with these photographs of Paul on top of the timeline. This allows the user to quickly see all photographs of Paul taken during Paul's stay in San Francisco between 1997 and 2002.

The user can also change the level of abstraction of the focal attribute, sliding attribute, and annotated attribute. In the case of a continuous attribute, such as Time, the scale of the value may be shrunk or enlarged. For example, for the Time attribute, the timescale can be demarcated by year, month, or day. In the case of a discrete attribute, such as People or Place, the level of abstraction can be based on different logical scales. For example, for the People attribute, the scale can be individuals, friends, colleagues, or families. At the individual level, the system can show only the photographs related to a specific individual. At the family level, the system can show photographs of people who are in the family of that individual. In one embodiment, the user can use a UI element, such as a scrollbar or arrows, to shift the level of abstraction of the focal, sliding, and annotated attributes.

Retrieval Thresholds

In cases where a large number of photographs exist based on the user set attribute criteria, the system can prioritize the display of photographs based on the user's interest. In one embodiment, the system can assign a higher priority to photographs submitted by someone in the user's social network (including the user). Photographs that have been tagged with names of people in the user's social network may also receive a higher priority. In further embodiments, the system may assign a higher priority to photographs that are highly rated or bookmarked by the user, highly rated by other users, or highly rated by others in the user's social network. The system can also assign a high priority to photographs submitted by those whose profiles (e.g., age, location, etc.) are similar to those of the user viewing the photograph.

The following examples illustrate implementations of some embodiments of the present invention.

Exemplary Implementation

FIG. 1 illustrates an exemplary GUI which allows a user to traverse photographs based on multiple dimensional attributes, in accordance with one embodiment of the present invention. In this example, GUI 100 includes a world map 102, a timeline 104, and a focal attribute field 108. Also displayed are a zoom control 110, a sliding indicator 112, and a strip of photographs 106.

As illustrated in FIG. 1, a user designates the People attribute as the focal attribute, and specifies its value to be "Bob," which is a name of an individual. The user also moves sliding indicator 112 to point to 2006 along timeline 104. In response, the system displays all the photographs associated with Bob and the year 2006 in thumbnail strip 106 in chronological order. Note that if thumbnail strip 106 cannot contain all the photographs of Bob taken in 2006, the user can click on the dark arrow on either end of strip 106 to view the additional photographs. In one embodiment, the user can change the level of abstraction for the Time attribute, which in this case is the timescale, by clicking and dragging a number on timeline 104. As timeline 104 becomes stretched or compressed, the system can automatically adjust the time unit, which can be decade, year, month, or day, displayed on timeline 104.

Also illustrated in GUI 100 is world map 102 that indicates the places associated with the photographs displayed in strip 106. In this example, when the user slides indicator 112 along timeline 104, the Time attribute is the sliding attribute and the Place attribute is the annotated attribute. In one embodiment, the system can indicate the places on map 102, which correspond to photographs displayed in strip 106. For example, the system can display photographs associated with the same place with a background of a common color in strip 106, and highlight this place on map 102 with the same color. Furthermore, the user can use zoom control 110 to change the zoom level of the map 102 and configure different levels of abstraction for the Place attribute.

In one embodiment, after the user specifies a person as the focal attribute, the system can illustrate a trajectory of the person's travel on the map corresponding to different times. As shown in FIG. 1, after the user chooses to focus on "Bob," the system shows that Bob has traveled from Hong Kong to San Francisco, and then to Philadelphia during a corresponding period shown on timeline 104. In one embodiment, each location is represented by a dot, and the size of the dot reflects the number of photographs taken at that location.

In a further embodiment, if the user selects a group of people as the focal attribute, the system can display the location and trajectory of each person in the group. This feature allows the user to see how everybody in the group has relocated to different places, and find out who still remains in his vicinity.

Figure 2:
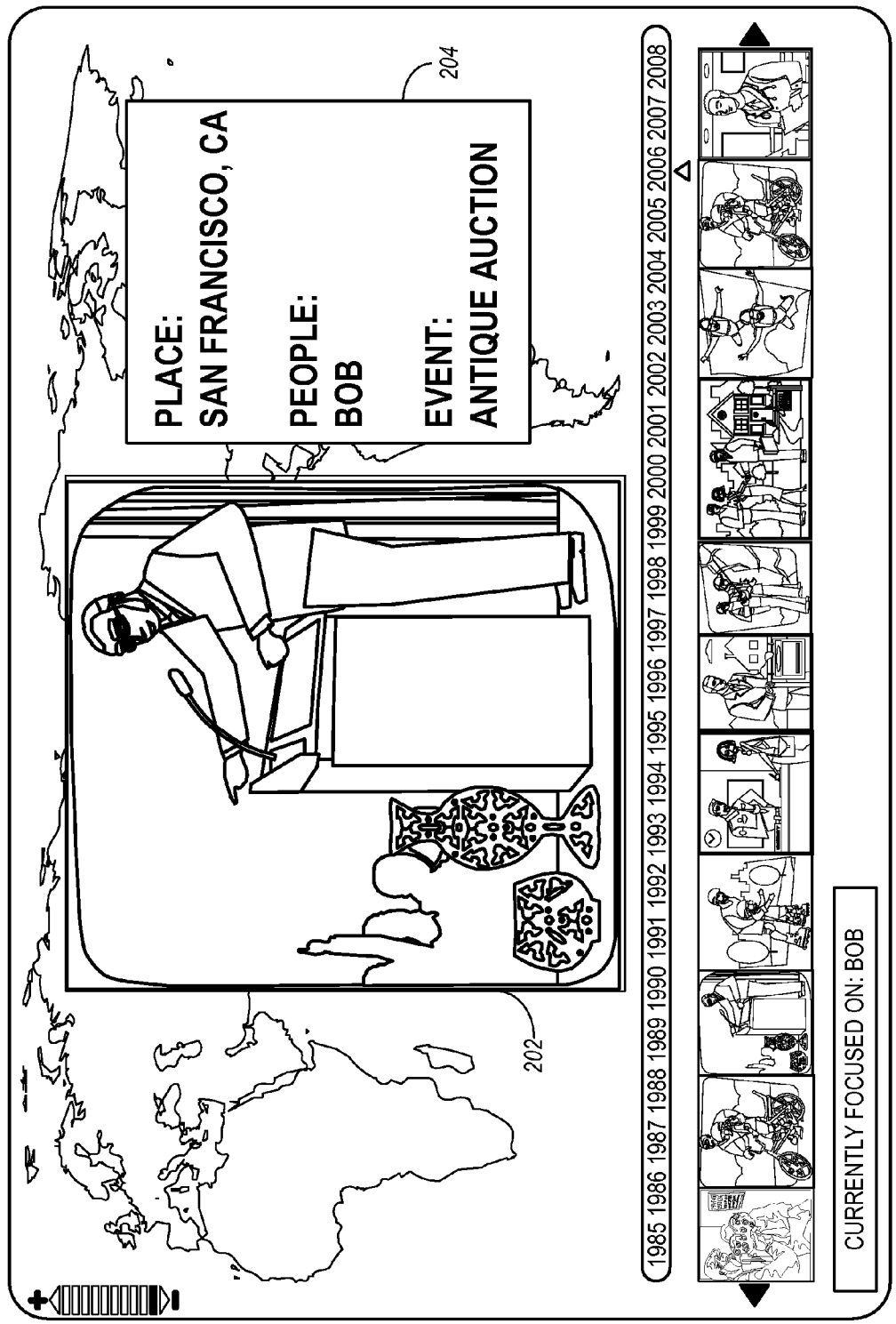
FIG. 2 illustrates an exemplary GUI which displays a photograph pertaining to a particular person "Bob" as specified by a user, in accordance with an embodiment of the present invention.

The user can click on a thumbnail in strip 106 to see a photograph in its full size, as illustrated in FIG. 2. In this example, a particular photograph 202 of Bob is displayed in full size. Also displayed in a field 204 are the values of some dimensional attributes: Place ("San Francisco"), People ("Bob"), and Event ("Antique Auction"). Based on photograph 202, the user can re-designate some of the attributes and traverse a different set of photographs. For example, the user can now designate the Place attribute as the focal attribute, specify its value to be "San Francisco," and see all the photos associated with San Francisco over a number of years.

The user can also designate the Event attribute as the focal attribute and see all the photographs related to antique auctions. Moreover, the user can designate the Time attribute as the sliding attribute and view all the photographs related with antique auctions in any given year over the world. Alternatively, the user can designate the Place attribute as the sliding attribute and view all the photographs related with antique auctions in any given place over a number of years.

Figure 3:
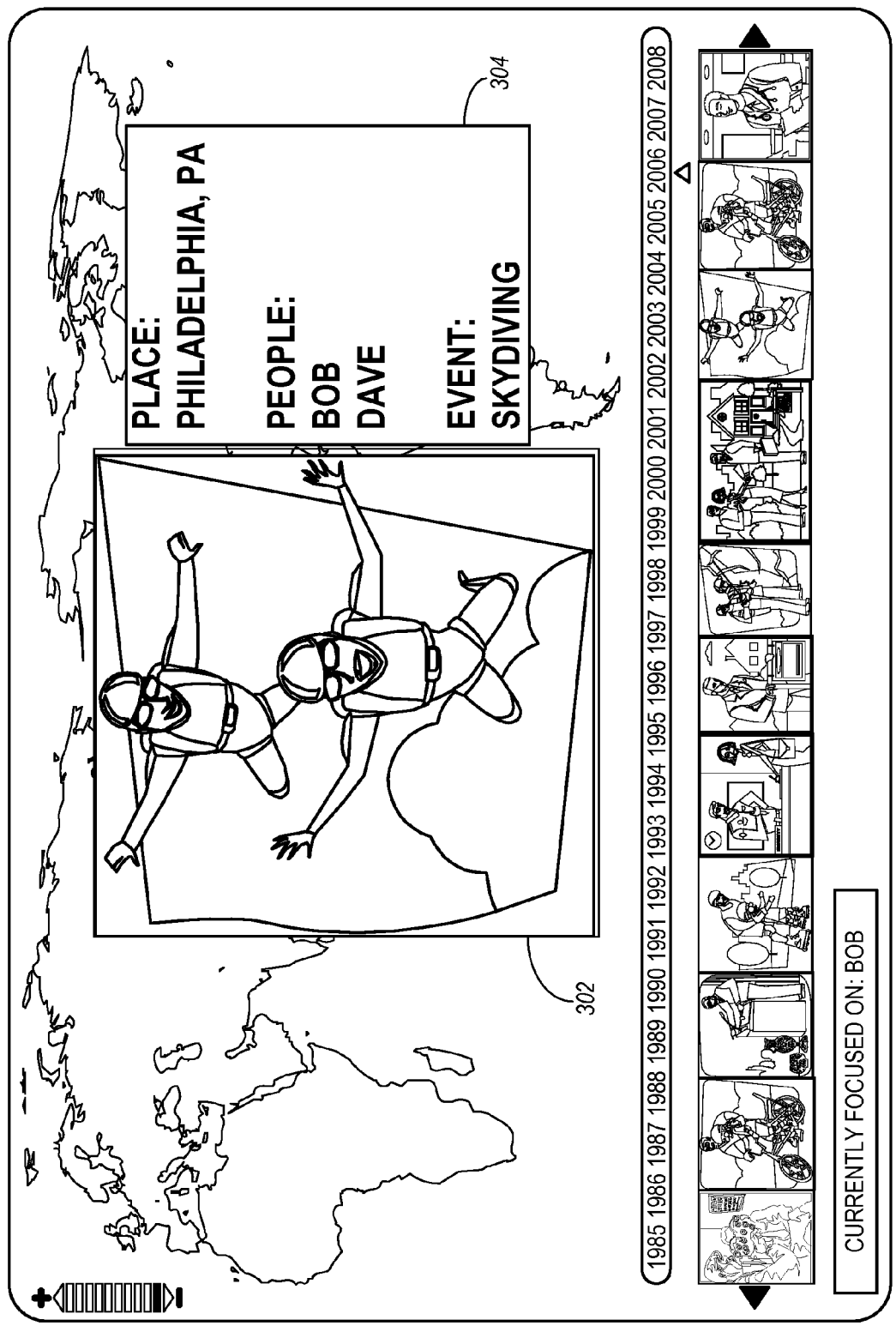
FIG. 3 illustrates an exemplary GUI which displays another photograph pertaining to "Bob" as specified by the user, in accordance with an embodiment of the present invention.

FIG. 3 illustrates another photograph 302 which is associated with Bob and Philadelphia. In the example, the user can change the value of the focal attribute, which is the People attribute, to "Dave" by clicking on the name "Dave" in a field 304 that displays the attribute values. In response, the system displays the photographs associated with Dave in a strip in chronological order. This way, the user can easily "branch" out from one group of photographs to another. Here, photograph 302 is an intersection that hinges on the People attribute of these two groups of photographs.

Figure 4:
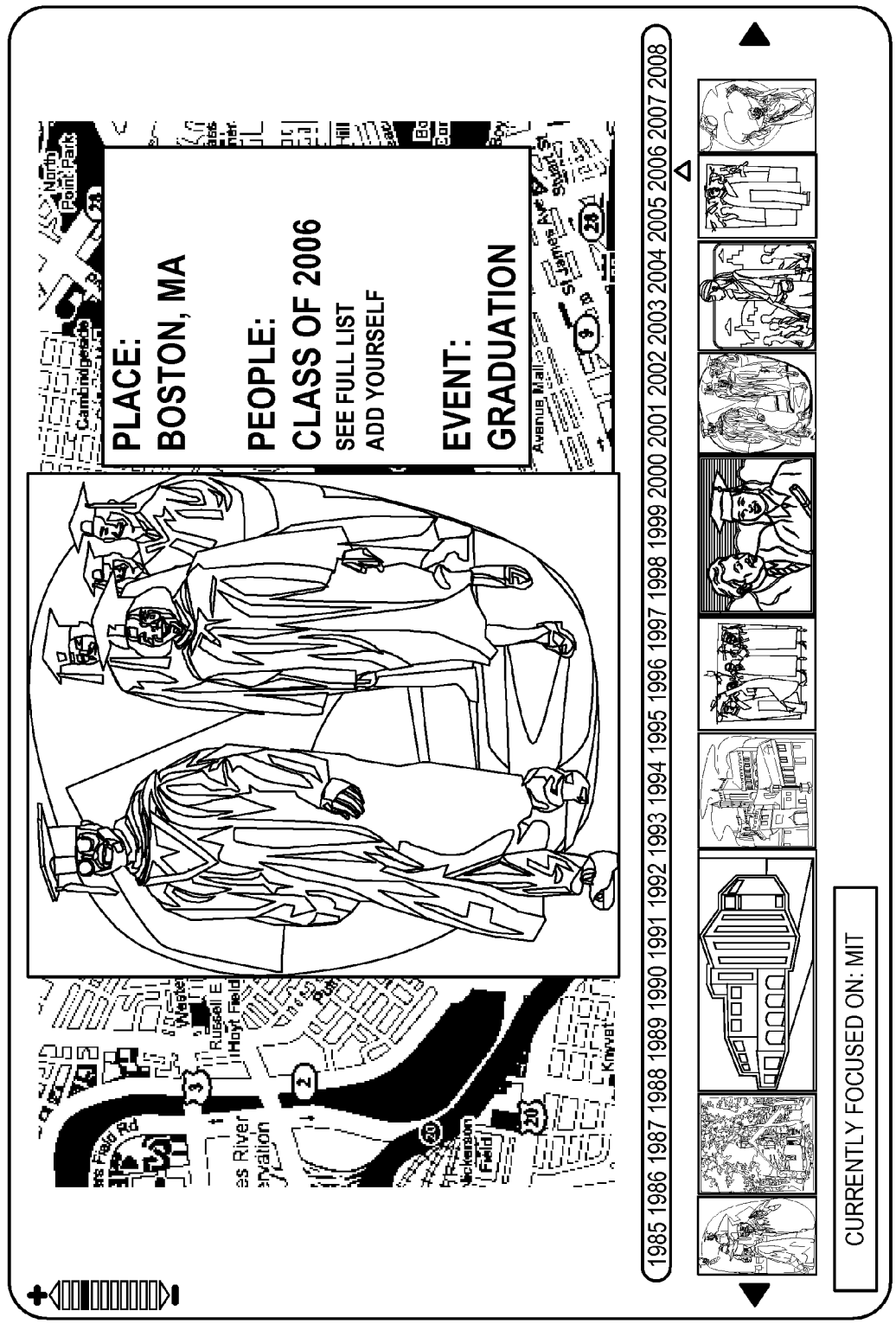
FIG. 4 illustrates an exemplary GUI which displays a photograph pertaining to a place "MIT" in accordance with an embodiment of the present invention.

FIG. 4 illustrates another example where the focal attribute is the Place attribute. Here, the value of the focal attribute is "MIT." As a result, the system displays the photographs related to the Massachusetts Institute of Technology. Note that the background map's zoom level is set to the street level, which allows the user to select more specific locations within the MIT campus. Also illustrated is a full-size photograph of a graduation ceremony for the class of 2006. A user can then click on the text "graduation" to see all the photographs for that event (in which case the Event attribute becomes the focal attribute), or click on the text "class of 2006" to see all the photographs related to the people in the class of 2006 (in which case the People attribute becomes the focal attribute).

The GUI examples illustrated in FIGS. 1-4 can be generated by a web server and displayed as a web page on a user's browser. They can also be generated by a portal attached to the repository. In general, embodiments of the present invention can be implemented with various communication mechanisms.

Figure 5:
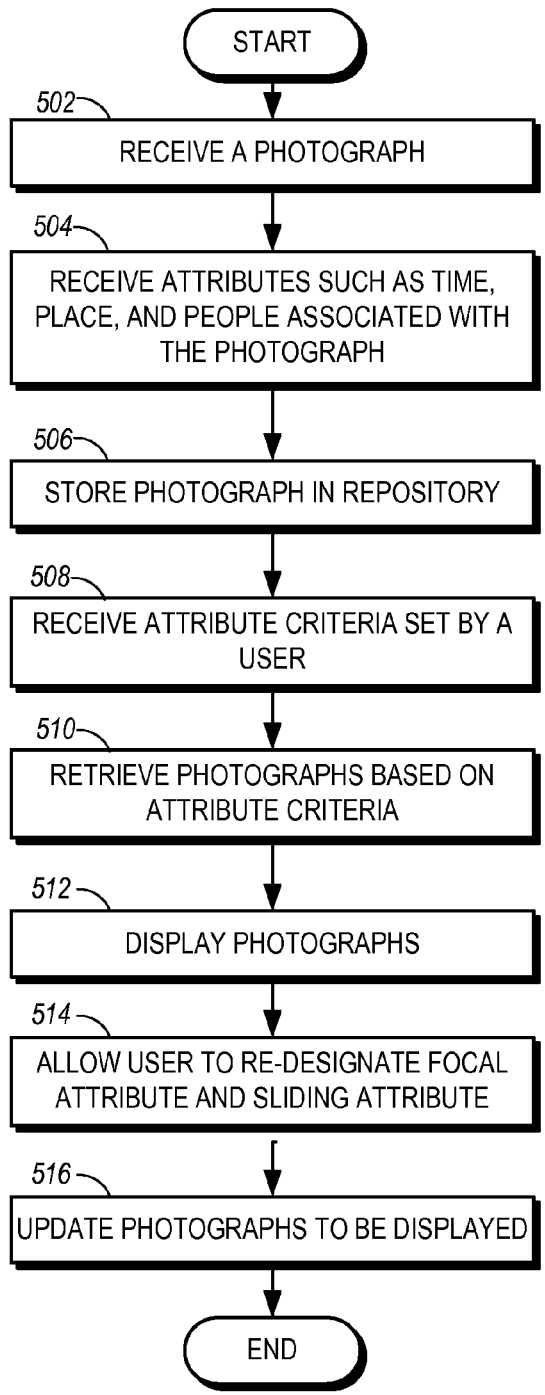
FIG. 5 presents a flowchart illustrating an exemplary process for storing digital records with multiple dimensional attributes in accordance with an embodiment of the present invention.

FIG. 5 presents a flowchart illustrating an exemplary process for storing digital records with multiple dimensional attributes in accordance with an embodiment of the present invention. During operation, the system receives a photograph uploaded by a user (operation 502). The system further receives dimensional attributes such as Time, Place, and People associated with the photograph (operation 504). The system then stores the photograph in a repository (operation 506).

When a user is trying to view photographs, the system receives a set of attribute criteria set by the user (operation 508). The attribute criteria can include a designation of a focal attribute, its abstraction level, and its value. The attribute criteria can also include the designation of a sliding attribute, one or more annotation attributes, and their respective abstraction levels.

The system then retrieves photographs based on the attribute criteria (operation 510), and displays the retrieved photographs (operation 512). In addition, the system allows the user to re-designate the focal attribute and sliding attribute (operation 514), and updates the photographs correspondingly (operation 516).

Figure 6:
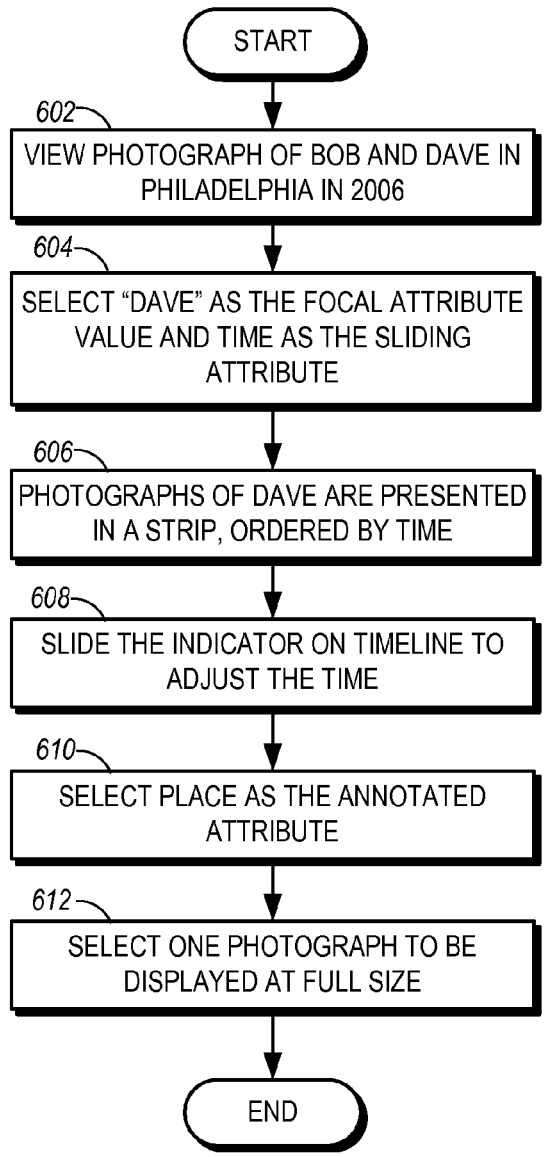
FIG. 6 presents a flowchart illustrating an example of how a user can traverse photographs based on multiple dimensional attributes in conjunction with the example illustrated in FIG. 3, in accordance with an embodiment of the present invention.

FIG. 6 presents a flowchart illustrating an example of how a user can traverse photographs based on multiple dimensional attributes in conjunction with the example illustrated in FIG. 3, in accordance with an embodiment of the present invention. At the beginning of the process, the user views photograph 302 of Bob and Dave, which is associated with Philadelphia and the year 2006 (operation 602). The user then selects "Dave" as the focal attribute value and Time as the sliding attribute (operation 604). In response to this selection, photographs of Dave are presented in a strip, ordered by time (operation 606).

Next, the user slides the indicator on the timeline to adjust the time (operation 608). The user can further select Place as the annotated attribute (operation 610). After system displays the photographs of Dave associated with the specified time, the user can select one photograph to be displayed at its full size (operation 612).

Figure 7:
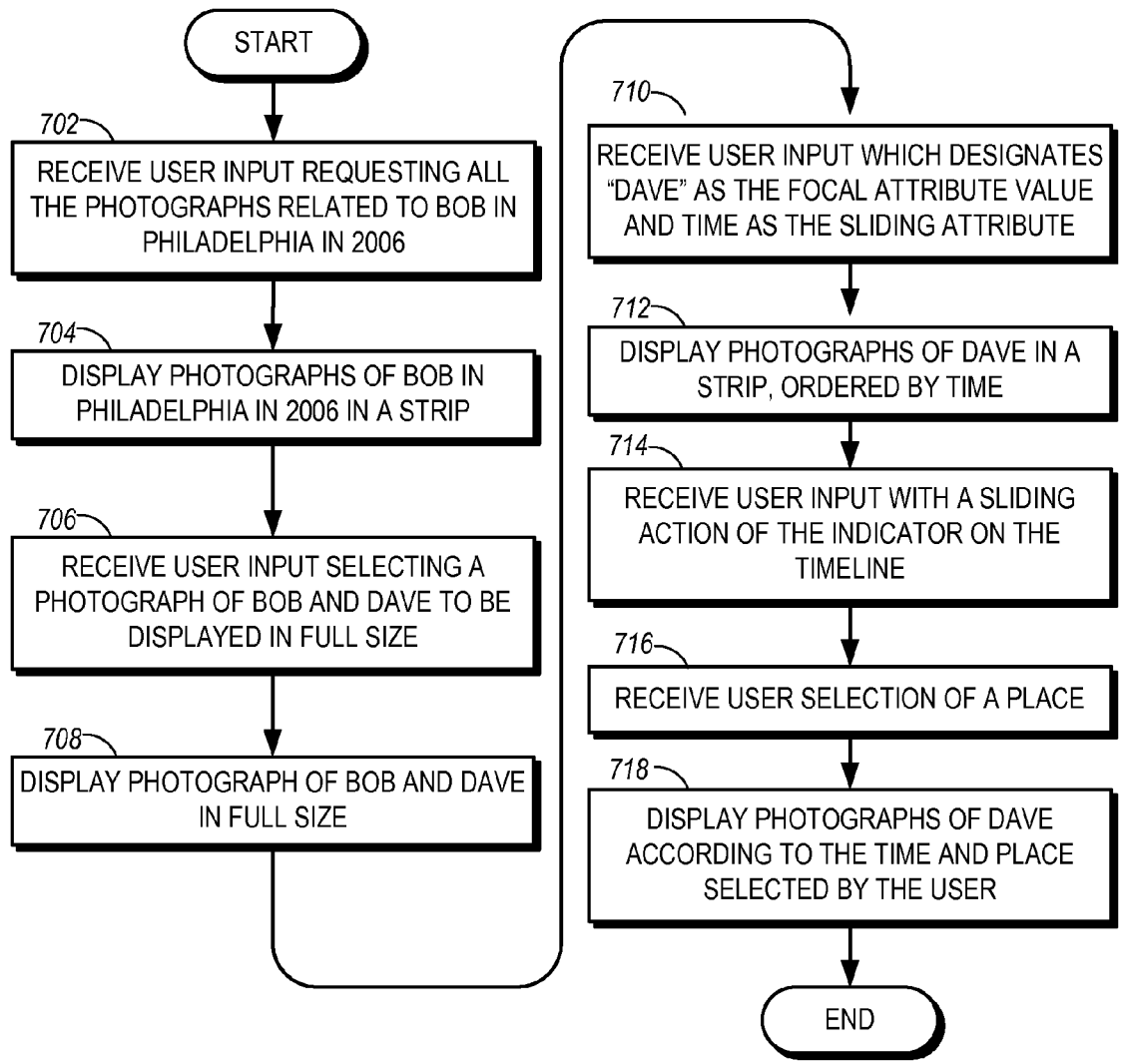
FIG. 7 presents a flowchart illustrating an exemplary process of how the system allows the user to traverse photographs based on multiple dimensional attributes in conjunction with the example illustrated in FIG. 3, in accordance with an embodiment of the present invention.

FIG. 7 presents a flowchart illustrating an exemplary process of how the system allows the user to traverse photographs based on multiple dimensional attributes in conjunction with the example illustrated in FIG. 3, in accordance with an embodiment of the present invention. During operation, the system receives a user input that requests all the photographs related to Bob in Philadelphia in 2006 (operation 702). In response, the system displays photographs of Bob in Philadelphia in 2006 in a strip (operation 704).

Next, the system receives a user input selecting a photograph of Bob and Dave to be displayed in full size (operation 706). The system then displays photograph 302 of Bob and Dave in full size (operation 708). The system further receives a user input which designates "Dave" as the focal attribute value and Time as the sliding attribute (operation 710). In response, the system displays photographs of Dave in a strip, ordered by time (operation 712).

The system additionally receives a user input with a sliding action of the indicator on the timeline, which indicates a specific time (operation 714). The system also receives a user selection of a place (operation 716). In turn, the system displays photographs of Dave according to the time and place selected by the user (operation 718).

Figure 8:
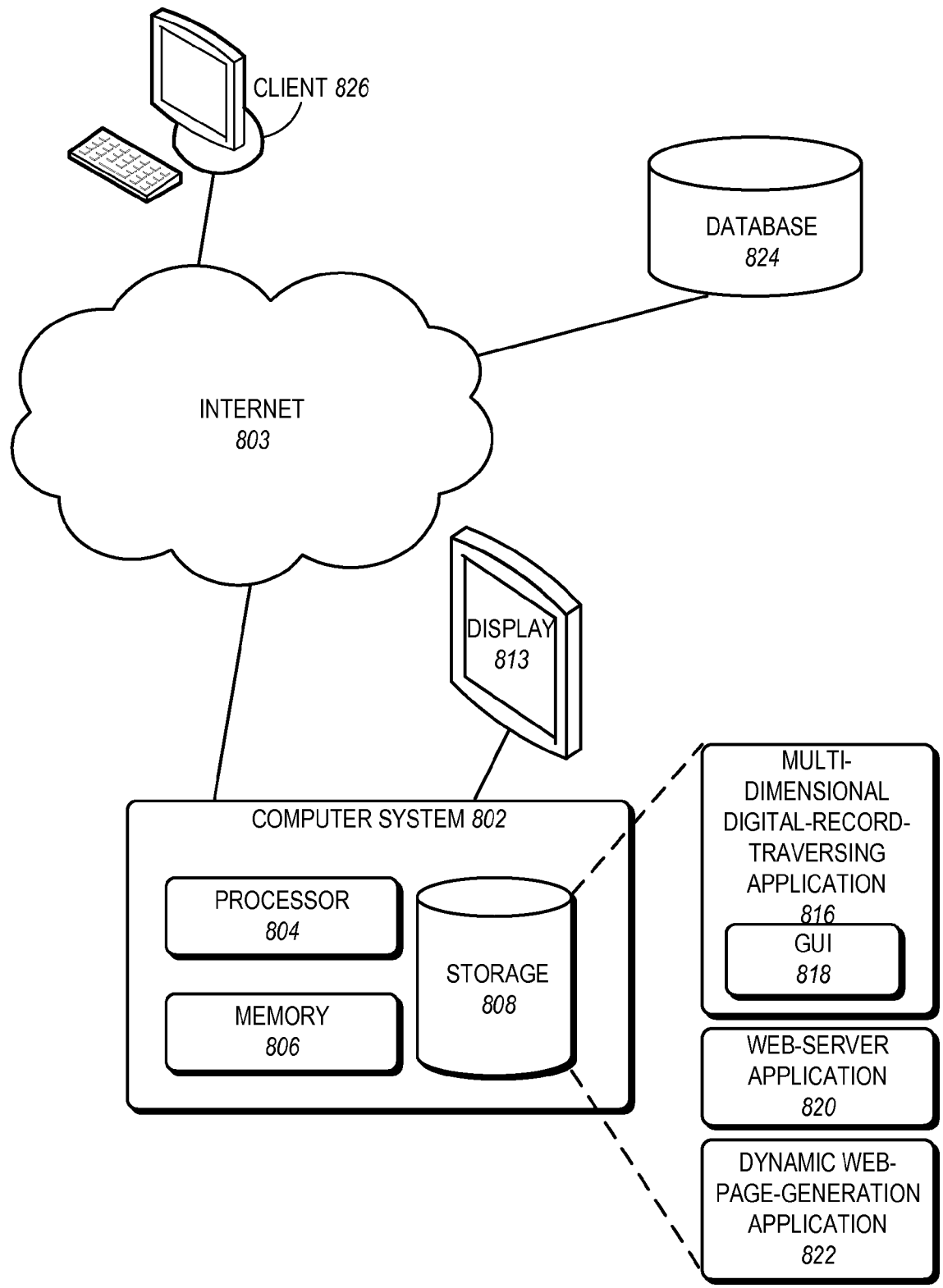
FIG. 8 illustrates a computer system that facilitates digital record traversing based on multiple dimensional attributes in accordance with one embodiment of the present invention.

FIG. 8 illustrates a computer system that facilitates digital record traversing based on multiple dimensional attributes in accordance with one embodiment of the present invention. A computer system 802 includes a processor 804, a memory 806, and a storage device 808. Computer system 802 is also coupled to the Internet 803 and a display device 813. Storage device 808 stores a web-server application 820, a dynamic web-page-generation application 822, and a multi-dimensional digital-record-traversing application 816. Multi-dimensional digital-record-traversing application 816 includes a GUI module 818. Also coupled to Internet 803 are a client 826 and a database 824, which in one embodiment serves as a repository for the digital records.

During operation, multi-dimensional digital-record-traversing application 816, web-server application 820, and dynamic web-page-generation application 822 are loaded from storage device 808 into memory 806 and executed by processor 804. Web-server application 820 is running as a server process and responds to requests sent by client 826. When computer system 802 receives a request from client 826, multi-dimensional digital-record-traversing application 816 formulates queries to database 824 based on the user's attribute criteria. For example, application 816 can formulate queries based on the Time attribute, People attribute, and/or Place attribute to retrieve the photographs from database 824.

In response, database 824 may return the photographs or links to the photographs to computer system 802. Subsequently, dynamic web-page-generation application 822 can dynamically generate a web page based on the links to the photographs returned by database 824. Web-server application 820 then returns this dynamically generated web page to client 826. When the user changes the attribute criteria (e.g., changes the focal attribute and/or sliding attribute), client 826 sends a new request to computer 802. In response, multi-dimensional digital-record-traversing application 816 formulates a new query to database 824. Dynamic web-page-generation application 822 then generates a new web page based on the results returned by database 824. This new web page is then transmitted by web-server application 820 to client 826.

The system described above can be implemented in various applications. For example, this system can be part of a photo-album application that allows family members to organize their photo albums. This system can also generate automated slideshows or screen savers.

In some embodiments, this system can be part of a social-networking website, where a large number of users can submit, share, and explore photographs. At the same time, the website can provide social-networking functionality, such as allowing users to specify relationships, post photograph ratings, send invitations, infer relationships, etc. In one embodiment, the system can infer that two people know each other from the knowledge that they repeatedly appear in the same photographs. Based on this knowledge, the system can make suggestions to one user to add the other user to his social network if the other user is not already in his network.

In some embodiments, the system described above can be incorporated in a mobile application running on a hand-held device. If the hand-held device has a global-positioning-system (GPS) function, the user can use this record-traversing system to explore the history of places of interest. In these applications, photographs may be categorized by towns, museums, and news archives for tourism or learning purposes. For example, a user can explore the past 100 years of London by viewing historical photographs while strolling through modern London.

In some embodiments, the system can also allow the user to post "imagined" or "projected" future scenarios in the form of digital images, textual descriptions, or other forms of digital records. That is, the user can predict how people or places will change over time. Other users can then rate these projections.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for traversing digital records with dimensional attributes, the method comprising:
   storing a number of digital records;
   associating a respective digital record with a number of attributes, wherein each attribute is specified in a level from multiple levels of abstraction;
   receiving inputs from a user to set one or more criteria on the attributes of the digital records to be presented by:
     receiving a user-specified value of at least one fixed attribute of the digital records to be presented;
     receiving a changed value for at least one non-fixed attribute of the digital records to be presented; and
     receiving a user-specified level of abstraction for the fixed and/or non-fixed attribute of the digital records to be presented; and
   presenting a set of digital records matching the attribute criteria set by the user in a sliding bar corresponding to a range of continuous values for the non-fixed attribute, wherein each of the presented digital records is associated with both the user-specified value and the user-specified level of abstraction, and wherein the digital records are ordered in the sliding bar by their values for the non-fixed attribute.

2. The method of claim 1, wherein a respective digital record comprises one or more of:
  a photograph;
  a piece of video;
  a piece of audio; and
  a piece of text.

3. The method of claim 1, further comprising presenting values for non-changing, non-fixed attributes with the associated digital records, thereby providing annotative information for the presented digital records to the user.

4. The method of claim 1, wherein an attribute of a respective digital record corresponds to at least one of:
  a time;
  a range of time;
  a place;
  a person;
  a group of people;
  an organization;
  an entity; and
  an event.

5. The method of claim 4, wherein receiving the user-specified value of the fixed attribute comprises:
  receiving a time, thereby allowing digital records associated with the specified time to be presented;
  receiving a place, thereby allowing digital records associated with the specified place to be presented;
  receiving an entity, thereby allowing digital records associated with the specified entity to be presented;
  receiving an event, thereby allowing digital records associated with the specified event to be presented; or
  receiving a person, a group of people, and/or an organization, thereby allowing digital records associated with the person, group of people, or organization to be presented.

6. The method of claim 4, wherein receiving the changed value of the non-fixed attribute comprises:
  receiving a time value, thereby allowing digital records associated with different times to be presented;
  receiving a place value, thereby allowing digital records associated with different places to be presented;
  receiving an entity value, thereby allowing digital records associated with different entities to be presented;
  receiving an event value, thereby allowing digital records associated with different events to be presented; or
  receiving a value indicative of people and/or groups, thereby allowing digital records associated with different people and/or groups to be presented.

7. The method of claim 4, wherein presenting the set of digital records based on the attribute criteria set by the user comprises displaying on a graphical user interface (GUI) at least one digital record whose attributes satisfy the criteria and one or more of:
  a slide bar labeled with time values to indicate the time associated with the displayed digital record and to allow the user to specify a different time by sliding an indicator along the slide bar;
  a map to indicate the place associated with the displayed digital record and to allow the user to specify a different place by indicating a point on the map;
  a first text field to indicate the person, group, or organization associated with the displayed digital record and to allow the user to specify a different person, group, or organization; and
  a second text field to indicate the event associated with the displayed digital record and to allow the user to specify a different event.

8. A computer-readable medium storing instructions which when executed by a computer cause the computer to perform a method for traversing digital records with dimensional attributes, the method comprising:
  storing a number of digital records;
  associating a respective digital record with a number of attributes, wherein each attribute is specified in a level from multiple levels of abstraction;
  receiving inputs from a user to set one or more criteria on the attributes of the digital records to be presented by:
    receiving a user-specified value of at least one fixed attribute of the digital records to be presented;
    receiving a changed value for at least one non-fixed attribute of the digital records to be presented; and
    receiving a user-specified level of abstraction for the fixed and/or non-fixed attribute of the digital records to be presented; and
  presenting a set of digital records matching the attribute criteria set by the user in a sliding bar corresponding to a range of continuous values for the non-fixed attribute, wherein each of the presented digital records is associated with both the user-specified value and the user-specified level of abstraction, and wherein the digital records are ordered in the sliding bar by their values for the non-fixed attribute.

9. The computer-readable medium of claim 8, wherein a respective digital record comprises one or more of:
  a photograph;
  a piece of video;
  a piece of audio; and
  a piece of text.

10. The computer-readable medium of claim 8, wherein the method further comprises presenting values for non-changing, non-fixed attributes with the associated digital records, thereby providing annotative information for the presented digital records to the user.

11. The computer-readable medium of claim 8, wherein an attribute of a respective digital record corresponds to at least one of:
  a time;
  a range of time;
  a place;
  a person;
  a group of people;
  an organization;
  an entity; or
  an event.

12. The computer-readable medium of claim 11, wherein receiving the user-specified value of the fixed attribute comprises:
  receiving a time, thereby allowing digital records associated with the specified time to be presented;
  receiving a place, thereby allowing digital records associated with the specified place to be presented;
  receiving an entity, thereby allowing digital records associated with the specified entity to be presented;
  receiving an event, thereby allowing digital records associated with the specified event to be presented; or receiving a person, a group of people, and/or an organization, thereby allowing digital records associated with the person, group of people, or organization to be presented.

13. The computer-readable medium of claim 11, wherein receiving the changed value of the non-fixed attribute comprises:
   receiving a time value, thereby allowing digital records associated with different times to be presented;
   receiving a place value, thereby allowing digital records associated with different places to be presented;
   receiving an entity value, thereby allowing digital records associated with different entities to be presented;
   receiving an event value, thereby allowing digital records associated with different events to be presented; or
   receiving a value indicative of people and/or groups, thereby allowing digital records associated with different people and/or groups to be presented.

14. The computer-readable medium of claim 11, wherein presenting the set of digital records based on the attribute criteria set by the user comprises displaying on a GUI at least one digital record whose attributes satisfy the criteria and one or more of:
   a slide bar labeled with time values to indicate the time associated with the displayed digital record and to allow the user to specify a different time by sliding an indicator along the slide bar;
   a map to indicate the place associated with the displayed digital record and to allow the user to specify a different place by indicating a point on the map;
   a first text field to indicate the person, group, or organization associated with the displayed digital record and to allow the user to specify a different person, group, or organization; and
   a second text field to indicate the event associated with the displayed digital record and to allow the user to specify a different event.

15. A computer system for traversing digital records with dimensional attributes, the computer system comprising:
   a processor;
   a memory coupled to the processor;
   a repository configured to store a number of digital records;
   an association mechanism configured to associate each digital record with a number of attributes, wherein a respective attribute is specified in a level from multiple levels of abstraction;
   a digital-record retrieving mechanism configured to receive input from a user to set one or more criteria on the attributes of the digital records to be presented by:
      receiving a user-specified value of at least one fixed attribute of the digital records to be presented;
      receiving a changed value for at least one non-fixed attribute of the digital records to be presented; and
      receiving a user-specified level of abstraction for the fixed and/or non-fixed attribute of the digital records to be presented; and
   a presentation mechanism configured to present a set of digital records matching the attribute criteria set by the user in a sliding bar corresponding to a range of continuous values for the non-fixed attribute, wherein each of the presented digital records is associated with both the user-specified value and the user-specified level of abstraction, and wherein the digital records are ordered in the sliding bar by their values for the non-fixed attribute.

16. The computer system of claim 15, wherein a respective digital record comprises one or more of:
   a photograph;
   a piece of video;
   a piece of audio; and
   a piece of text.

17. The computer system of claim 15, wherein the presentation mechanism is further configured to present values for non-changing, non-fixed attributes with the associated digital records, thereby providing annotative information for the presented digital records to the user.

18. The computer system of claim 15, wherein an attribute of a respective digital record corresponds to at least one of:
   a time;
   a range of time;
   a place;
   a person;
   a group of people;
   an organization;
   an entity; or
   an event.

19. The computer system of claim 18, wherein while receiving the user-specified value of the fixed attribute, the digital-record retrieving mechanism is configured to:
   receive a time, thereby allowing digital records associated with the specified time to be presented;
   receive a place, thereby allowing digital records associated with the specified place to be presented;
   receive an entity, thereby allowing digital records associated with the specified entity to be presented;
   receive an event, thereby allowing digital records associated with the specified event to be presented; or
   receive a person, a group of people, and/or an organization, thereby allowing digital records associated with the person, group of people, or organization to be presented.

20. The computer system of claim 18, wherein while receiving the changed value for the non-fixed attribute, the digital-record retrieving mechanism is configured to:
   receive a time value, thereby allowing digital records associated with different times to be presented;
   receive a place value, thereby allowing digital records associated with different places to be presented;
   receive an entity value, thereby allowing digital records associated with different entities to be presented;
   receive an event value, thereby allowing digital records associated with different events to be presented; or
   receive a value indicative of people and/or groups, thereby allowing digital records associated with different people and/or groups to be presented.

21. The computer system of claim 18, wherein while presenting the set of digital records based on the attribute criteria set by the user, the presentation mechanism is configured to display on a GUI at least one digital record whose attributes satisfy the criteria and one or more of:
   a slide bar labeled with time values to indicate the time associated with the displayed digital record and to allow the user to specify a different time by sliding an indicator along the slide bar;
   a map to indicate the place associated with the displayed digital record and to allow the user to specify a different place by indicating a point on the map;
   a first text field to indicate the person, group, or organization associated with the displayed digital record and to allow the user to specify a different person, group, or organization; and
   a second text field to indicate the event associated with the displayed digital record and to allow the user to specify a different event.

* * * * *